UNITED STATES PATENT OFFICE.

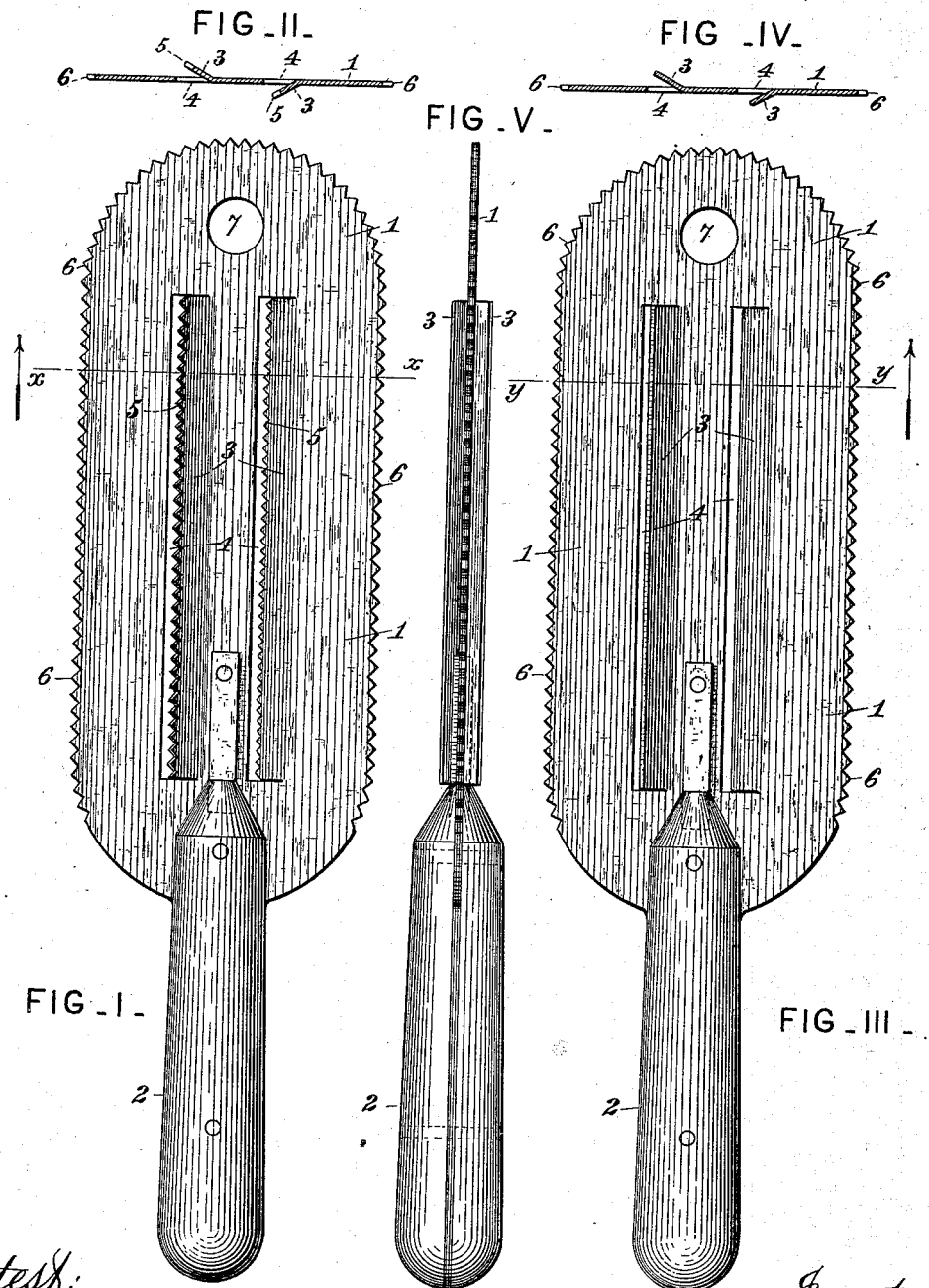

FREDERICK G. KENT, OF WADSWORTH, ILLINOIS.

CURRY-COMB.

SPECIFICATION forming part of Letters Patent No. 410,167, dated September 3, 1889.

Application filed December 13, 1888. Serial No. 293,440. (No model.)

*To all whom it may concern:*

Be it known I, FREDERICK G. KENT, a citizen of the United States, residing at Wadsworth, in the county of Lake and State of Illinois, have invented certain new and useful Improvements in Curry-Combs, of which the following is a specification.

My invention relates to that class of curry-combs which are provided with teeth or serrations on the edges of the blade; and it consists, primarily, in forming inclined wings on each side of such blade, which act, in conjunction with the serrated edges of the blade, to remove the dirt, &c., from the animal being curried.

In order that my invention may be fully understood, I will proceed to describe the same with reference to the accompanying drawings, in which—

Figure I is a side elevation of the preferred form of my device. Fig. II is a cross-section on the line $x\ x$. Fig. III is a side view illustrating a modification, and Fig. IV is a cross-section of the same on the line $y\ y$. Fig. V is an edge view.

I desire it to be clearly understood that although the device may have any desired number of slots and wings, with the wings presented in any desired direction, the principle of the device remains the same.

Referring now to the drawings, 1 represents the blade of the curry-comb, which consists of a single piece of material, metal being preferable, to which is secured a suitable handle 2.

3 are longitudinal wings or flanges formed integrally with the blade, the latter being slotted longitudinally at 4, for the purpose of forming them, and these wings are bent out from the sides of the blade so that they project inclined to the sides, and are preferably provided with teeth or serrations 5, as shown in Figs. I and II, which act, in conjunction with the teeth 6 on the edges of the blade, to remove the dirt, &c., from an animal. In Figs. III and IV the wings are shown without serrations. The serrations 6 are continued around the end of the blade, as shown in the drawings. A hole 7 is made near the end of the blade to afford facility for hanging the device up.

Having thus described my invention, the following is what I claim as new therein and desire to secure by Letters Patent:

1. In a curry-comb, a blade provided with serrated edges and inclined wings, the edges and wings being adapted to act in conjunction with each other, substantially as set forth.

2. In combination with a curry-comb having a blade provided with serrated edges and having a slot or slots, side wings projecting from the edges of the slot or slots and formed integrally with the blade, substantially as set forth.

3. A curry-comb consisting of a blade having serrated edges and provided with longitudinal slot or slots, and wings projecting from the blade at the edges of the slot or slots, substantially as set forth.

FREDERICK G. KENT.

Witnesses:
F. L. MCCRAKEN,
EDWARD MCMANAMAN.